(12) United States Patent
Kojima

(10) Patent No.: US 7,838,583 B2
(45) Date of Patent: Nov. 23, 2010

(54) RUBBER COMPOSITION FOR CAP TREAD AND PNEUMATIC TIRE HAVING CAP TREAD USING SAME

(75) Inventor: Ryoji Kojima, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/808,729

(22) Filed: Jun. 12, 2007

(65) Prior Publication Data
US 2008/0004382 A1    Jan. 3, 2008

(30) Foreign Application Priority Data
Jun. 30, 2006  (JP) ............................. 2006-180961

(51) Int. Cl.
*B60C 1/00*  (2006.01)
*B60C 5/00*  (2006.01)
*C08K 5/24*  (2006.01)
*C08K 3/04*  (2006.01)

(52) U.S. Cl. .................... 524/261; 524/495; 152/450

(58) Field of Classification Search ............ 524/261, 524/495; 152/450
See application file for complete search history.

(56) References Cited

U.S. PATENT DOCUMENTS

| | | | |
|---|---|---|---|
| 5,851,321 A * | 12/1998 | Midorikawa et al. | 152/209.5 |
| 5,939,484 A * | 8/1999 | Araki et al. | 524/492 |
| 6,015,850 A * | 1/2000 | Nakamura et al. | 524/188 |
| 2005/0124740 A1* | 6/2005 | Klockmann et al. | 524/261 |
| 2005/0154156 A1* | 7/2005 | Karato et al. | 526/82 |
| 2006/0052507 A1* | 3/2006 | Minakoshi | 524/492 |

FOREIGN PATENT DOCUMENTS

| | | |
|---|---|---|
| EP | 0 846 825 A2 | 6/1998 |
| EP | 0 864 606 A1 | 9/1998 |
| EP | 0872515 A1 | 10/1998 |
| EP | 0 978 534 A2 | 2/2000 |
| JP | 61-178206 A | 8/1986 |
| JP | 61-196802 A | 9/1986 |
| JP | 62-241933 A | 10/1987 |
| JP | 5-239227 A | 9/1993 |
| JP | 10-152581 A | 6/1998 |
| JP | 10-168234 A | 6/1998 |
| JP | 10330540 A * | 12/1998 |
| JP | 2002-30183 A | 1/2002 |
| JP | 2002-47378 A | 2/2002 |
| JP | 2002-275311 A | 9/2002 |
| WO | WO 96/29364 A1 | 9/1996 |

OTHER PUBLICATIONS

Carbon Black Table, Encyclopedia of Polymer Science and Technology.*
Shin-Etsu Silicone Fluid.*
Carbon Black Abstract, Encyclopedia of Polymer Science and Technology.*
Anonymous: "Carbon Black: Physicochemical Properties," Tokai Carbon Co. JP., [online] XP002521806 Retrieved from Internet: URL:http://www.tokaicarbon.co.jp/en/products/carbon_b/seast/index.html> [retrieved on Mar. 30, 2009] *table 1*.
Li Bing Yan, "A Handbook of the Production and Application of Carbon Black", Chemical Industry Publication, Sep. 1, 2009, pp. 566-567.
Japanese Office Action dated Mar. 16, 2010 for Application No. 2007-140892 (translation-in-part).

* cited by examiner

*Primary Examiner*—Mark Eashoo
*Assistant Examiner*—Angela C Scott
(74) *Attorney, Agent, or Firm*—Birch, Stewart, Kolasch & Birch, LLP

(57) ABSTRACT

The present invention provides a rubber composition for a cap tread that can improve steering stability on a snowy road and a pneumatic tire having a cap tread using the rubber composition. The rubber composition for a cap tread comprises 5 to 200 parts by weight of a carbon black having an iodine adsorption amount of 100 to 300 mg/g, and 2 to 50 parts by weight of a silicone oil based on 100 parts by weight of at least one diene rubber selected from the group consisting of a natural rubber, an isoprene rubber, a styrene-butadiene rubber and a butadiene rubber, and 1 to 20 parts by weight of a silane coupling agent based on 100 parts by weight of the silicone oil, and the pneumatic tire having a cap tread is prepared by using the rubber composition.

4 Claims, No Drawings

RUBBER COMPOSITION FOR CAP TREAD AND PNEUMATIC TIRE HAVING CAP TREAD USING SAME

BACKGROUND OF THE INVENTION

The present invention relates to a rubber composition for a cap tread and a pneumatic tire having a cap tread using the same.

The use of spike tires and the loading of chains to tires have been carried out for running on an icy and snowy road surface, but when these are used, a road surface is chipped off by metal pins of the spike tires or the chains on the tires and there is generated a dust problem that materials chipped off from the road surface fly in air. Therefore, studless tires replacing spike tires and chains are proposed for running on an icy and snowy road surface.

Since normal tires have remarkably lower frictional coefficients on an icy and snowy road surface in comparison with the case of general road surface and slip easily, materials and designs of studless tires have been investigated. For example, there are reported development of a rubber composition comprising a diene rubber superior in low temperature property and device of increasing surface edge portions by changing unevenness of a tire surface. However, there has been a problem that studless tires have inferior frictional coefficients on an icy and snowy road surface in comparison with spike tires. Further, it is known that inorganic short fibers having a scratching effect are compounded. However, since the short fibers drop off due to stimulation and abrasion caused by running etc., there has been a problem that a scratching effect is lost.

JP2002-47378A discloses a tread rubber composition for a tire comprising specified amounts of a diene rubber, glass fiber, carbon black, silica and silicone rubber powder, in which abrasion resistance and performance on ice are improved and hardening of a rubber due to aging is suppressed. However, performance on snow (steering stability on snow) is not considered at all and improvements are still required.

JP10-168234A discloses a tread rubber composition especially for a race tire comprising specified amounts of a diene rubber, carbon black, silica and a silicone polymer such as silicone rubber powder or liquid silicone rubber, in which wet grip performance is improved. However, performance on snow is not considered at all and improvements are still required.

SUMMARY OF THE INVENTION

It is an object of the present invention to provide a rubber composition for a cap tread that can improve steering stability on a snowy road and a pneumatic tire having a cap tread prepared by using the rubber composition.

The present invention relates to a rubber composition for a cap tread comprising 5 to 200 parts by weight of a carbon black having an iodine adsorption amount of 100 to 300 mg/g and 2 to 50 parts by weight of silicone oil based on 100 parts by weight of at least one diene rubber selected from the group consisting of a natural rubber, an isoprene rubber, a styrene-butadiene rubber and a butadiene rubber and 1 to 20 parts by weight of a silane coupling agent based on 100 parts by weight of the silicone oil.

The present invention further relates to a pneumatic tire having a cap tread prepared by using the rubber composition for a cap tread.

DETAILED DESCRIPTION

The rubber composition for a cap tread of the present invention comprises a diene rubber component, a carbon black, a silicone oil and a silane coupling agent.

As the aforementioned diene rubber component, at least one diene rubber selected from the group consisting of a natural rubber (NR), an isoprene rubber (IR), a styrene-butadiene rubber (SBR) and a butadiene rubber (BR) is used because superior low temperature property is required for a tread of a studless tire.

Among these, NR and/or BR are preferable and a combination of NR and BR is more preferable because superior reinforcing property is obtained even for a soft tread of a studless tire.

When NR is used, a content of NR in the diene rubber component is preferably not less than 10% by weight, more preferably not less than 20% by weight. When the content of NR is less than 10% by weight, processability tends to be deteriorated. Further, the content of NR is preferably not more than 90% by weight, more preferably not more than 80% by weight. When the content of NR exceeds 90% by weight, low temperature property necessary for a tread of a studless tire cannot be kept and performance on snow tends to be greatly deteriorated.

As for BR, 1,4-cis BR and 1,4-trans BR usually used in the rubber industry can be used.

When BR is used, a content of BR in the diene rubber component is preferably not less than 10% by weight, more preferably not less than 20% by weight. When the content of BR is less than 10% by weight, low temperature property necessary for a tread of a studless tire cannot be kept and performance on snow tends to be greatly deteriorated. Further, the content of BR is preferably not more than 90% by weight, more preferably not more than 80% by weight. When the content of BR exceeds 90% by weight, processability tends to be deteriorated.

Examples of diene rubbers other than NR, IR, SBR and BR are diene rubbers that are usually used in the rubber industry such as a butyl rubber (IIR), a chloroprene rubber (CR), an acrylonitrile-butadiene rubber (NBR), an ethylene-propylene-diene rubber (EPDM) and a styrene-isoprene-butadiene rubber (SIBR). However, it is preferable not to use diene rubbers other than NR, IR, SBR and BR because processability is deteriorated.

It is necessary that the iodine adsorption amount (IA) of the carbon black used in the rubber composition for a cap tread of the present invention is not less than 100 mg/g, preferably not less than 110 mg/g because reinforcing property can be improved. Further, it is necessary that the iodine adsorption amount (IA) of the carbon black is not more than 300 mg/g, preferably not more than 250 mg/g because low heat build-up property, durability and processability can be improved.

Carbon black is not particularly limited as far as the above-mentioned physical properties and effects can be obtained, and for example, SHOWBLACK N220 available from Cabot Japan Kabushiki. Kaisha. (IA: 121 mg/g) can be used as the carbon black.

An amount of the carbon black is not less than 5 parts by weight, preferably not less than 10 parts by weight based on 100 parts by weight of the diene rubber component. When the amount of the carbon black is less than 5 parts by weight, a reinforcing effect is not obtained. Further, the amount of the carbon black is not more than 200 parts by weight, preferably not more than 100 parts by weight. When the amount of the carbon black exceeds 200 parts by weight, processability is deteriorated.

It is one of features of the present invention that silicone oil and silane coupling agent are used together.

It is an object of the present invention to improve tire performance on snow by utilizing low temperature property of the silicone oil used in the present invention. Namely, the present invention is different from the inventions described in JP2002-47378A and JP10-168234A because an object of these inventions is to improve tire performance on ice by utilizing lipophilic property (water repellent property) of a silicone rubber.

Silicone oil is not particularly limited and those that have been blended in a rubber composition can be used. Exemplified are silicone oils that have been used in the tire industry, for instance, dimethyl silicone oil, methylphenylsilicone oil, and methylhydrogenesilicone oil. These silicone oils may be used alone and at least two kinds thereof may be used in combination. Among these, dimethylsilicone oil is preferable because processability is superior.

An example of dimethylsilicone oil is KF-965-100 cs available from Shin-Etsu Chemical Co., Ltd.

An amount of the silicone oil is not less than 2 parts by weight, preferably not less than 5 parts by weight, particularly preferably not less than 10 parts by weight based on 100 parts by weight of the diene rubber component. When the amount of the silicone oil is less than 2 parts by weight, an effect by compounding the silicone oil can not be expected. Further, the amount of the silicone oil is not more than 50 parts by weight, preferably not more than 40 parts by weight, particularly preferably not more than 20 parts by weight. When the amount of the silicone oil exceeds 50 parts by weight, dispersibility is lowered and abrasion resistance is lowered.

The silicone oil used in the present invention is compounded as a softening agent and when it is used together with a silane coupling agent, low temperature property is improved. Therefore, the silicone oil of the present invention is different from the silicone rubbers described in JP2002-47378A or JP10-168234A or silicone polymers such as a liquid silicone rubber which is liquid before being vulcanized.

The silane coupling agent is not particularly limited as far as it is one conventionally compounded in a rubber composition. Examples of the silane coupling agent are sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane.

As for the sulfide silane coupling agents, Si69 (bis(3-triethoxysilylpropyl)tetrasulfide) available from Degussa GmbH can be used.

An amount of the silane coupling agent is not less than 1 part by weight, preferably not less than 2 parts by weight based on 100 parts by weight of the silicone oil. When the amount of the silane coupling agent is less than 1 part by weight, an effect by compounding the silane coupling agent is not observed and abrasion resistance is lowered. Further, the amount of the silane coupling agent is not more than 20 parts by weight, preferably not more than 15 parts by weight. When the amount of the silane coupling agent exceeds 20 parts by weight, an effect of increasing the amount of the silane coupling agent is not obtained although cost increases, and reinforcing property and abrasion resistance are lowered.

It is one of features of the present invention that the silicone oil and the silane coupling agent are used together. By using the silicone oil and the silane coupling agent together, there is obtained an effect that the silicone oil is bonded to a rubber polymer and acts as a softening agent without bleeding in the rubber.

In addition to the aforementioned rubber component, carbon black, silicone oil and silane coupling agent, there can be suitably compounded in the rubber composition for a cap tread of the present invention, compounding agents that are usually used in the rubber industry, for example, fillers other than carbon black such as silica, various softening agents such as oil and wax, various antioxidants, stearic acid, zinc oxide, a vulcanizing agent such as sulfur, and a vulcanization accelerator.

The pneumatic tire of the present invention can be produced by a usual method using the rubber composition for a cap tread of the present invention. Namely, the rubber composition for a cap tread of the present invention in which the aforementioned compounding agents are compounded according to necessity is extruded and processed into a shape of a cap tread of a tire at an unvulcanized stage, and molded by a usual method on a tire molding machine together with other members of the tire to obtain an unvulcanized tire. The pneumatic tire of the present invention is obtained by heating and pressuring the unvulcanized tire in a vulcanizer.

The pneumatic tire of the present invention obtained as explained above is preferably used as a studless tire because the tread is superior in low temperature property and an improvement of performance on snow can be expected. Further, since the tread of the pneumatic tire of the present invention has a two-layer structure comprising a base tread and a cap tread, there is obtained an effect that pattern rigidity can be maintained while using a soft rubber.

EXAMPLES

The present invention is explained in detail based on Examples, but the present invention is not limited only to these.

Various chemicals used in Examples and Comparative Examples are explained below.

Natural rubber (NR): RSS#3.

Butadiene rubber (BR): UBEPOL-BR150B available from Ube Industries Ltd.

Carbon black: SHOWBLACK N220 (IA: 121 mg/g) available from CABOT JAPAN Kabushiki. Kaisha.

Oil: DAINA PROCESS OIL PS323 available from Idemitsu Kosan Co., Ltd.

Silicone oil: KF-965-100 cs (dimethylsilicone oil) available from Shin-Etsu Chemical Co., Ltd.

Wax: SUNNOC WAX available from OUCHI SHINKO CHEMICAL INDUSTRIAL CO., LTD.

Antioxidant: NOCRAC 6C (N-(1,3-dimethylbutyl)-N'-phenyl-p-phenylenediamine) available from OUCHI SHINKO CHEMICAL INDUSTRIAL CO., LTD.

Stearic acid: Stearic acid available from NOF Corporation.

Zinc oxide: ZINC OXIDE No. 1 available from Mitsui Mining And Smelting Co., Ltd.

Silane coupling agent: Si69 (bis(3-triethoxysilylpropyl) tetrasulfide) available from Degussa GmbH.

Sulfur: Sulfur powder available from Tsurumi Chemical Industry Co., Ltd.

Acidic vulcanization accelerator: NOCCELER CZ (N-cyclohexyl-2-benzothiazolylsulfenamide) available from OUCHI SHINKO CHEMICAL INDUSTRIAL CO., LTD.

Basic vulcanization accelerator: NOCCELER D (1,3-diphenylguanidine) available from OUCHI SHINKO CHEMICAL INDUSTRIAL CO., LTD.

EXAMPLES 1 TO 3 AND COMPARATIVE EXAMPLES 1 AND 2

According to a compounding prescription shown in Table 1, compounding agents other than sulfur and a vulcanization accelerator were kneaded for 3 to 5 minutes using a 1.7 L internal Banbury mixer until the temperature reached 150° C., to obtain kneaded articles. Sulfur and a vulcanization accelerator were added to the kneaded articles, and kneaded under the condition of 70° C. for 2 minutes using an open roll, to obtain unvulcanized rubber compositions. Further, the unvulcanized rubber compositions were molded into a given size and then press-vulcanized under 170° C. for 12 minutes to obtain vulcanized rubber test pieces of Examples 1 to 3 and Comparative Examples 1 and 2.

(Hardness Measurement at Low Temperature)

Vulcanized rubber test pieces with a given size were prepared from the vulcanized rubber compositions and hardness was measured with a spring type A under the condition of −10° C. according to JIS K6253 "Hardness test method of vulcanized rubber and thermoplastic rubber".

(Viscoelasticity Test)

Loss tangents (tan δ) of vulcanized rubber test pieces at temperatures from −60° C. to 70° C. were measured under the conditions of a frequency of 10 Hz, an initial strain of 10% and a dynamic strain of 0.5% using a viscoelasticity spectrometer manufactured by Iwamoto Seisakusyo Kabushiki. Kaisha. Glass transition points (Tg) of the vulcanized rubber test pieces were calculated from tan δ-temperature curves. The smaller the value is, the more excellent the dynamic property at low temperature is.

(Steering Stability on Snow)

The aforementioned unvulcanized rubber compositions were molded into a shape of a cap tread with a calendar roll by a usual method, and were laminated with other tire members and press-vulcanized under the condition of 170° C. for 12 minutes to obtain studless tires (tire size: 195/65R15). In-vehicle running by a car loaded with the obtained tires was conducted at a test course with compacted snow road surface. Further, a test driver conducted sensory evaluation of stability of control during steering, referring to the index of steering stability on snow of Comparative Example 1 as 100. The larger the index of steering stability on snow is, the more superior the steering stability on a snowy road surface is.

Results of the aforementioned evaluations are shown in Table 1.

TABLE 1

|  | Ex. 1 | Ex. 2 | Ex. 3 | Com. Ex. 1 | Com. Ex. 2 |
|---|---|---|---|---|---|
| Amounts (part by weight) | | | | | |
| NR | 75 | 75 | 75 | 75 | 75 |
| BR | 25 | 25 | 25 | 25 | 25 |
| Carbon black | 50 | 50 | 50 | 50 | 50 |
| Aromatic oil | 20 | 15 | 10 | 25 | 25 |
| Silicone oil | 5 | 10 | 15 | — | 10 |
| Wax | 1 | 1 | 1 | 1 | 1 |
| Antioxidant | 1 | 1 | 1 | 1 | 1 |
| Stearic acid | 2 | 2 | 2 | 2 | 2 |
| Zinc oxide | 3 | 3 | 3 | 3 | 3 |
| Silane coupling agent | 1 | 1 | 1 | 1 | — |
| Sulfur | 1 | 1 | 1 | 1 | 1 |
| Acidic vulcanization accelerator | 1.5 | 1.5 | 1.5 | 1.5 | 1.5 |
| Basic vulcanization accelerator | 1 | 1 | 1 | 1 | 1 |
| Evaluation Results | | | | | |
| Hardness (−10° C.) | 58 | 56 | 55 | 62 | 56 |
| Tg (° C.) | −60 | −62 | −64 | −55 | −62 |
| Index of steering stability on snow | 115 | 116 | 117 | 100 | 95 |

According to the present invention, there can be provided a rubber composition for a cap tread comprising specified amounts of a specific rubber component, a specific carbon black, a silicone oil and a silane coupling agent, thus enabling steering stability on a snowy road to be improved, and a pneumatic tire having a cap tread prepared by using the rubber composition.

What is claimed is:

1. A pneumatic tire having a tread with a two-layer structure, wherein the tread comprises a base tread and a cap tread, wherein a rubber composition of the cap tread comprises:
   10 to 100 parts by weight of a carbon black having an iodine adsorption amount of 100 to 300 mg/g,
   5 to 20 parts by weight of a silicone oil, and
   10 to 20 parts by weight of a softening agent other than the silicone oil
   based on 100 parts by weight of a diene rubber consisting of a natural rubber and a butadiene rubber, and
   2 to 20 parts by weight of a silane coupling agent
   based on 100 parts by weight of the silicone oil.

2. The pneumatic tire of claim 1, wherein the content of the natural rubber in the diene rubber is 10 to 90% by weight and the content of the butadiene rubber in the diene rubber is 10 to 90% by weight.

3. The pneumatic tire of claim 1, wherein the silicone oil is selected from the group consisting of dimethyl silicone oil, methylphenylsilicone oil, methylhydrogenesilicone oil and combinations thereof.

4. The pneumatic tire of claim 1, wherein the softening agent is an oil.

* * * * *